United States Patent
Rakshit et al.

(10) Patent No.: US 12,545,144 B2
(45) Date of Patent: Feb. 10, 2026

(54) PROGRAMMATIC SELECTION OF BATTERIES FROM BATTERY PACK

(71) Applicant: INTERNATIONAL BUSINESS MACHINES CORPORATION, Armonk, NY (US)

(72) Inventors: Sarbajit K. Rakshit, Kolkata (IN); Sudheesh S. Kairali, Kozhikode (IN); Binoy Thomas, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 18/326,161

(22) Filed: May 31, 2023

(65) Prior Publication Data
US 2024/0399926 A1    Dec. 5, 2024

(51) Int. Cl.
*B60L 58/18* (2019.01)
*B60L 58/16* (2019.01)
(Continued)

(52) U.S. Cl.
CPC ............ *B60L 58/18* (2019.02); *B60L 58/16* (2019.02); *B60L 58/24* (2019.02); *G01R 31/007* (2013.01);
(Continued)

(58) Field of Classification Search
CPC .......... B60L 58/18; B60L 58/16; B60L 58/24; B60L 2240/70; G01R 31/396; G01R 31/367; G01R 31/382; G01R 31/007
See application file for complete search history.

(56) References Cited

U.S. PATENT DOCUMENTS

| | | | |
|---|---|---|---|
| 10,328,805 B1 * | 6/2019 | Wyrobek | ................ B60L 53/00 |
| 2009/0085553 A1 | 4/2009 | Kumar | |

(Continued)

FOREIGN PATENT DOCUMENTS

| | | |
|---|---|---|
| KR | 20200100009 A | 8/2020 |
| WO | 2013080211 A1 | 6/2013 |

OTHER PUBLICATIONS

Arora et al, "Application of Robust Design Methodology to Battery Packs for Electric Vehicles: Identification of Critical Technical Requirements for Modular Architecture", MDPI, Article, Published: Jul. 2, 2018, 25 pages.

(Continued)

*Primary Examiner* — Peter D Nolan
*Assistant Examiner* — Mikko Okechukwu Obioha
(74) *Attorney, Agent, or Firm* — Jordan T. Schiller (57) ABSTRACT

A method for selecting a sequence of battery usage in EVs. The method includes identifying a health status of each battery in a battery pack, wherein the health status comprises power availability. The method further includes configuring usage of each battery individually, based on the identified health status of each battery in the battery pack, and estimating a power requirement for a context of travel, wherein the context of travel comprises at least one or more of the following: a selection of a route; road parameters; weather parameters; traffic conditions; and additional power required by a vehicle for various services to a user. The method further includes selecting a sequence of battery usage, for each battery in the battery pack, based on the estimated power requirement for traveling the route.

20 Claims, 3 Drawing Sheets

(51) Int. Cl.
*B60L 58/24* (2019.01)
*G01R 31/00* (2006.01)
*G01R 31/367* (2019.01)
*G01R 31/382* (2019.01)
*G01R 31/396* (2019.01)

(52) U.S. Cl.
CPC ......... *G01R 31/367* (2019.01); *G01R 31/382* (2019.01); *G01R 31/396* (2019.01); *B60L 2240/70* (2013.01)

(56) References Cited

U.S. PATENT DOCUMENTS

| | | | |
|---|---|---|---|
| 2011/0112781 A1 | 5/2011 | Anderson | |
| 2015/0266390 A1* | 9/2015 | Shin | H02J 7/00 701/22 |
| 2019/0152342 A1* | 5/2019 | Shen | B60L 50/64 |
| 2020/0313249 A1* | 10/2020 | Zhao | H01M 10/4257 |
| 2020/0384889 A1* | 12/2020 | Nishigaki | B60L 50/66 |
| 2021/0380013 A1* | 12/2021 | Moszynski | B60L 53/66 |
| 2022/0069368 A1 | 3/2022 | Hess | |
| 2022/0072962 A1* | 3/2022 | Maury | B60L 7/10 |
| 2022/0176939 A1 | 6/2022 | Poll | |
| 2022/0402399 A1* | 12/2022 | Staats | B60L 50/53 |

OTHER PUBLICATIONS

Ci et al., "Dynamic Reconfigurable Multi-Cell Battery: A Novel Approach to Improve Battery Performance", 2012 Twenty-Seventh Annual IEEE Applied Power Electronics Conference and Exposition (APEC), 2012, pp. 439-442.
IBM, "Connected and Autonomous Vehicle Development for Travel Industry", IBM Blog, accessed on May 10, 2023, 10 pages.
IBM, "Rethinking batteries before we have to rethink our world", IBM Research, Energy Storage, accessed on May 10, 2023, 9 pages.
O'Flaherty, "AI in action: Autonomous vehicles", IBM, Oct. 11, 2018, 2 pages.
IBM, "BeeAI now has multiple agents, and a standardized way for them to talk", https://research.ibm.com/blog, Mar. 17, 2025, 6 pages.
IBM, "What is IT infrastructure?", https://www.ibm.com/think/topics/infrastructure, Jun. 10, 2021, 7 pages.

* cited by examiner

PROGRAMMATIC SELECTION OF BATTERIES FROM BATTERY PACK

BACKGROUND

The present disclosure relates generally to the field of cognitive computing and more particularly to data processing and dynamic configuration of battery usage in electric vehicles EVs).

EVs are vehicles that use one or more electric motors for propulsion. Typically, EVs are powered autonomously by a battery. EVs include, but are not limited to, road and rail vehicles, surface and underwater vessels, electric aircraft, and electric spacecraft.

Experts say that more than a million new public EV charging stations will be needed in the United States (US) by 2030 to handle the rise of electric vehicles. There are currently about 150,000 EV chargers in the US, and about one-quarter of those are Level 3 fast chargers.

Adequate usage of EV batteries may mean the difference between getting stranded on the side of the road or successfully reaching an EV charging station.

Currently, there is no ideal way to maximize the life of the batteries, from a battery pack in EVs, to provide the required power for a given travel context. Therefore, it is necessary to define a new method to solve this problem.

BRIEF SUMMARY

Embodiments of the present invention disclose a method, a computer program product, and a system.

According to an embodiment, a method, in a data processing system including a processor and a memory, for selecting a sequence of battery usage in EVs. The method includes identifying a health status of each battery in a battery pack, wherein the health status comprises power availability. The method further includes configuring usage of each battery individually, based on the identified health status of each battery in the battery pack, and estimating a power requirement for a context of travel. The method further includes selecting a sequence of battery usage, for each battery in the battery pack, based on the estimated power requirement for traveling the route.

A computer program product, according to an embodiment of the invention, includes a non-transitory tangible storage device having program code embodied therewith. The program code is executable by a processor of a computer to perform a method. The method includes identifying a health status of each battery in a battery pack, wherein the health status comprises power availability. The method further includes configuring usage of each battery individually, based on the identified health status of each battery in the battery pack, and estimating a power requirement for a context of travel. The method further includes selecting a sequence of battery usage, for each battery in the battery pack, based on the estimated power requirement for traveling the route.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes identifying a health status of each battery in a battery pack, wherein the health status comprises power availability. The method further includes configuring usage of each battery individually, based on the identified health status of each battery in the battery pack, and estimating a power requirement for a context of travel. The method further includes selecting a sequence of battery usage, for each battery in the battery pack, based on the estimated power requirement for traveling the route.

DETAILED DESCRIPTION

In any battery pack of any EV, a set of individual batteries are packed and different batteries within the battery pack can have a different health status. Health status of individual batteries may depend on the level of dendrite deposition on the individual battery nodes, heat generation rate, condition of the electrodes and so forth. As such, the same amount of power transmission may not be possible from each battery in the battery pack.

Different combinations of batteries can be selected for power transmission to the vehicle. The selection of battery combinations provides aggregated power to the EV, while the batteries not being used get required cooling time.

In different contextual situations of travel, varying amounts of battery power may be required. For example, different contextual situations of travel can include a selected route, road parameters, weather parameters, traffic conditions, and any other additional power that may be required by the EV while operating such as console electronics, air-conditioning, and so forth.

Based on the varying amounts of battery power required to operate the EV in each travel context, the appropriate number of batteries are selected from the battery pack in the EV.

Currently, there is no ideal way to strategically maximize the life of the batteries, from a battery pack, to provide the required power for a given travel context.

The present invention proposes a method for selecting an appropriate number, and sequence, of batteries from the battery pack in a configured time-to-time basis so that the batteries provide required power, and get required cooldown time, for the context of travel in EVs.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
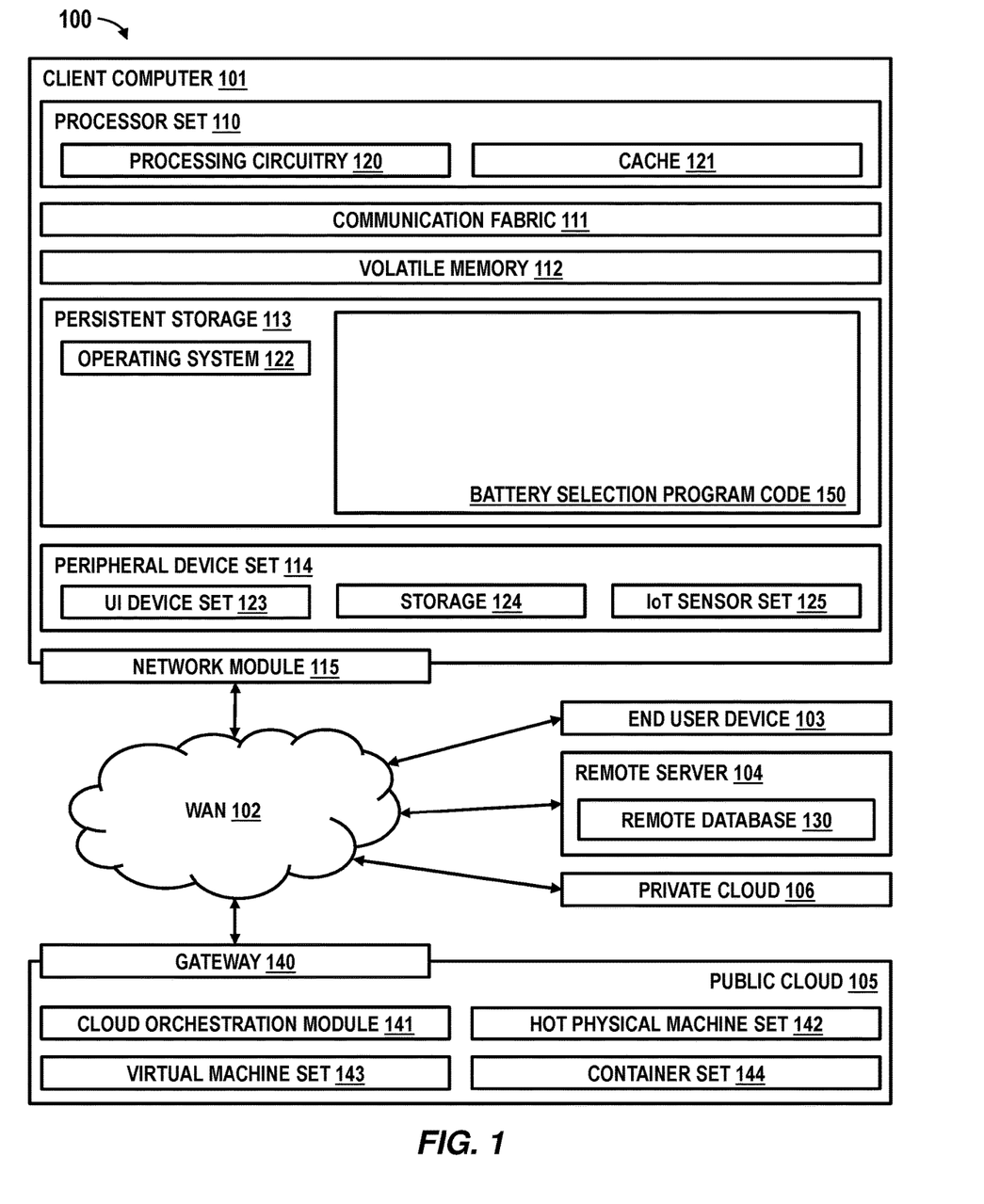
FIG. 1 depicts a diagram graphically illustrating the hardware components of computing environment 100 and a cloud computing environment, in accordance with an embodiment of the present invention.

FIG. 1 depicts a diagram graphically illustrating the hardware components of computing environment 100 and a cloud computing environment in accordance with an embodiment of the present invention.

Computing environment 100 contains an example of an environment for the execution of at least some of the computer code involved in performing the inventive methods, such as battery selection program code 150. In addition to the battery selection program code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and battery selection program code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in battery selection program code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface type operating systems that employ a kernel. The code included in battery selection program code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
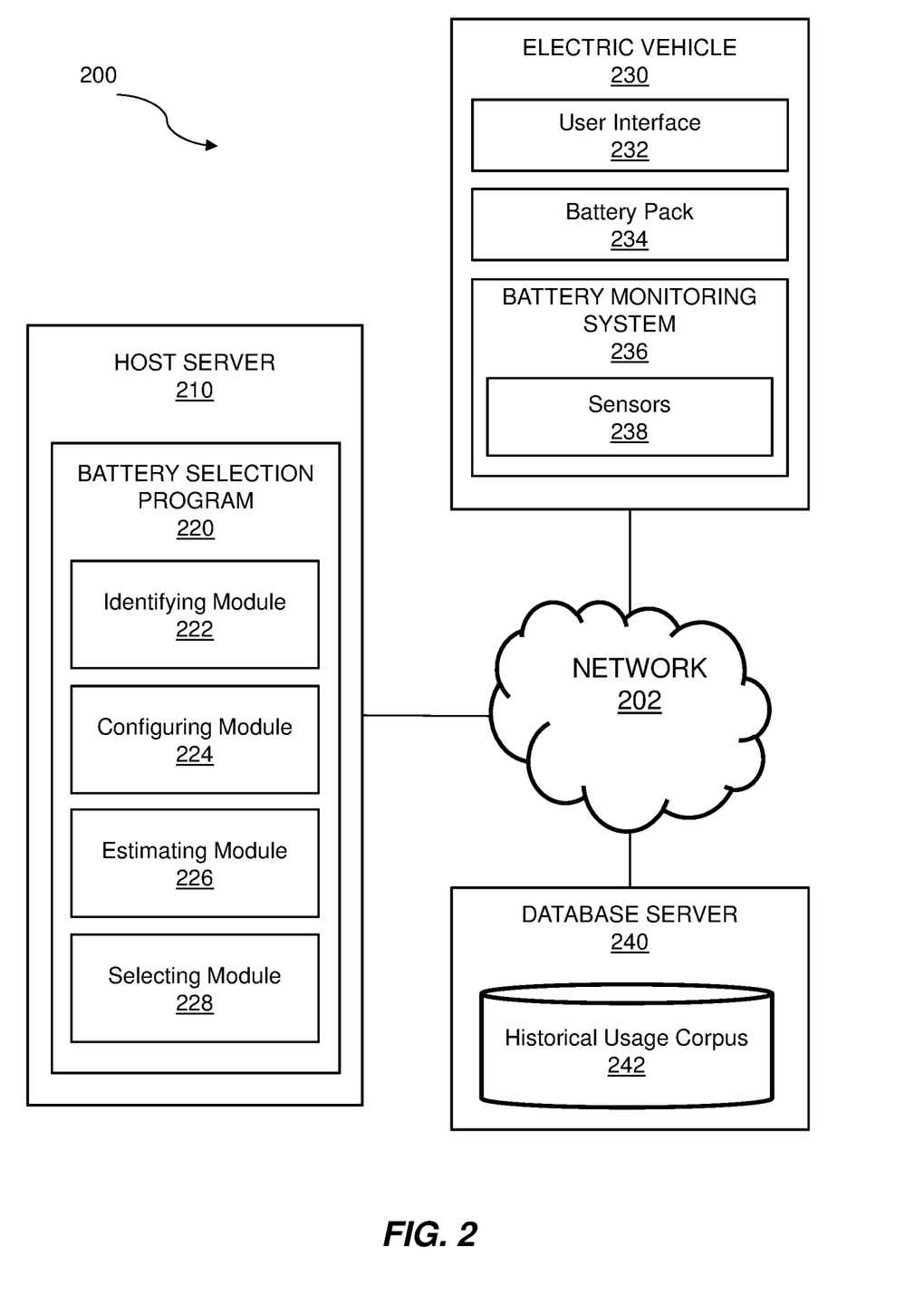
FIG. 2 illustrates battery selection computing environment 200, in accordance with an embodiment of the present invention.

FIG. 2 illustrates battery selection computing environment 200, in accordance with an embodiment of the present invention. Battery selection computing environment 200 includes host server 210, electric vehicle 230, and database server 240, all connected via network 202. The setup in FIG. 2 represents an example embodiment configuration for the present invention and is not limited to the depicted setup to derive benefit from the present invention.

In an exemplary embodiment, host server 210 includes battery selection program 220. In various embodiments, host server 210 may be a laptop computer, tablet computer, netbook computer, personal computer (PC), a desktop computer, a personal digital assistant (PDA), a smart phone, or any programmable electronic device capable of communicating with electric vehicle 230, and database server 240, via network 202. Host server 210 may include internal and external hardware components, as depicted, and described in further detail with reference to FIG. 1. In other embodiments, host server 210 may be implemented in a cloud computing environment, as further described in relation to FIG. 1. Host server 210 may also have wireless connectivity capabilities allowing it to communicate with electric vehicle 230, and database server 240, and other computers or servers over network 202.

With continued reference to FIG. 2, electric vehicle 230 includes user interface 232, battery pack 234, and battery monitoring system 236. In exemplary embodiments, electric vehicle 230 may be a car, a minivan, a truck, a tractor-trailer, a train, or any road (or off-road) vehicle. In exemplary embodiments, electric vehicle 230 can detect the health status of one or more batteries located within battery pack 234 of electric vehicle 230, via battery monitoring system 236.

In alternative embodiments, electric vehicle 230 may be any type of vehicle, such as a vehicle that flies in the sky (e.g., airplane, rocket ship, hot-air balloon, hovercraft, etc.), a vehicle that floats on the water (e.g., motorboat, yacht, jet ski, pontoon, freight ship, etc.), and any other vehicle, known to one of ordinary skill in the art, capable of being operated by a human, or autonomously.

While the present application focuses primarily on batteries within electric vehicles, the scope of the invention is not limited to electric vehicles. For example, the present invention may be used for any electronic device, gadget, machinery, hydraulics, or defined space that is operated by a human, or autonomously, containing one or more batteries wherein the selection of the one or more batteries is dynamically and strategically selected to maximize battery life and so that each battery gets required cooling time.

In exemplary embodiments, electric vehicle 230 includes user interface 232, which may be a computer program that allows a user to interact with electric vehicle 230 and other connected devices via network 202. For example, user interface 232 may be a graphical user interface (GUI). In addition to comprising a computer program, user interface 232 may be connectively coupled to hardware components, such as those depicted in FIG. 1, for sending and receiving data. In an exemplary embodiment, user interface 232 may be a web browser, however in other embodiments user interface 232 may be a different program capable of receiving user interaction and communicating with other devices, such as host server 210.

In exemplary embodiments, user interface 232 may be a touch screen display, a visual display, a remote operated display, or a display that receives input from a physical keyboard or touchpad located within electric vehicle 230, such as on the dashboard, console, etc. In alternative embodiments, user interface 232 may be operated via voice commands, BLUETOOTH, a mobile device that connects to electric vehicle 230, or by any other means known to one of ordinary skill in the art. In exemplary embodiments, a user may interact with user interface 232 to report a problem, update data inputs (e.g., route selection, weather parameters, traffic conditions, etc.), and/or update user preferences. In various embodiments, a user may interact with user interface 232 to provide feedback to battery selection program 220 via network 202.

In exemplary embodiments, electric vehicle 230 includes battery pack 234, which includes one or more individual batteries. Each battery provides power and recharges individually.

An electric vehicle battery, also known as a traction battery, is a rechargeable battery used to power the electric motors of a battery EV, or hybrid electric vehicle. Electric vehicle batteries are typically lithium-ion batteries that are designed for high power-to-weight ratio and energy density. Compared to liquid fuels, most current battery technologies have much lower specific energy, and this often impacts the maximum range of all-electric vehicles.

In exemplary embodiments, battery pack 234 is located in an electric vehicle 230 and includes sensor feeds to identify the health status of each battery in the battery pack 234.

In exemplary embodiments, electric vehicle 230 includes monitoring system 236, which comprises sensors 238. Sensors 238 may be a device, hardware component, module, or subsystem capable of detecting a health status (e.g., heat generation based on usage, norm of rate of discharge, rate of charging, and cool down time) of each battery in battery pack 234 and sending the detected data to other electronics (e.g., host server 210), components (e.g., historical usage corpus 242), or programs (e.g., battery selection program 220) within a system such as battery selection computing environment 200. In exemplary embodiments, sensors 238 are located within battery pack 234. The detected data collected by sensors 238 is key for identifying the health condition of the batteries and conveying this information to battery selection program 220.

Sensors 238, in exemplary embodiments, may be a software application, scanner, ultrasound, X-ray imaging, proximity sensor, camera, light sensor, infrared sensor, ultrasonic sensor, weight sensor, temperature sensor, heat sensor, analog sensor (e.g., potentiometers, force-sensing resistors), radar sensors, Internet of Things (IoT) sensors, lasers, gyroscopes, accelerometers, structured light systems, and other devices used for measuring the health status of an EV battery in battery pack 234.

In alternative embodiments, battery selection computing environment 200 may include any other systems and methods for collecting and utilizing battery monitoring system 236 data within an IoT system, known to one of ordinary skill in the art.

In exemplary embodiments, monitoring system 236 is capable of continuously monitoring, collecting, and saving collected data on database server 240, a local storage database, or sending the collected data to battery selection program 220 for analysis and storage.

In alternative embodiments, monitoring system 236 may be capable of detecting, communicating, pairing, or syncing with IoT devices, thus creating opportunities for more direct integration of the physical world into computer-based systems, and resulting in improved efficiency, accuracy, and economic benefit in addition to reduced human intervention.

Monitoring system 236 may be capable of transmitting detected and monitored battery data to battery selection program 220, either on a continuous basis or at set intervals. In other embodiments, monitoring system 236 may be configured to detect and monitor the batteries, in battery pack 234, based on any method known to one of ordinary skill in the art.

In various embodiments, sensors 238 may be embedded within battery pack 234 and contain a computer processing unit (CPU), memory, and power resource, and may be capable of communicating with electric vehicle 230, database server 240, and host server 210 over network 202.

In exemplary embodiments, database server 240 includes historical usage corpus 242. In various embodiments, database server 240 may be a laptop computer, tablet computer, netbook computer, personal computer (PC), a desktop computer, a personal digital assistant (PDA), a smart phone, a server, or any programmable electronic device capable of communicating with host server 210 and electric vehicle 230, via network 202. Database server 240 may include internal and external hardware components, as depicted, and described in further detail with reference to FIG. 1. In other embodiments, database server 240 may be implemented in a cloud computing environment, as described in relation to FIG. 1. Database server 240 may also have wireless connectivity capabilities allowing it to communicate with host server 210, electric vehicle 230, and other computers or servers over network 202.

In further exemplary embodiments, historical usage corpus 242 may store power requirements of EV 230 along varying contexts of travel by a user. As such, stored routes of a user provide battery selection program 220 with battery requirement information that may be helpful when configuring battery numbers, and sequence, for a given travel context.

In exemplary embodiments, historical usage corpus 242 may store historical routes of a user, together with battery pack 234 usage, according to weather conditions, traffic patterns, roadside obstacles, inclines, driver, and any other type of category known to one of ordinary skill in the art.

While historical usage corpus 242 is depicted as being stored on database server 240, in other embodiments, historical usage corpus 242 may be stored on electric vehicle 230, host server 210, battery selection program 220, or any other device or database connected via network 202, as a separate database. In alternative embodiments, historical usage corpus 242 may be comprised of a cluster or plurality of computing devices, working together, or working separately.

With continued reference to FIG. 2, host server 210 includes battery selection program 220. Host server 210 may be a laptop computer, tablet computer, netbook computer, personal computer (PC), a desktop computer, a personal digital assistant (PDA), a smart phone, or any programmable electronic device capable of communicating with electric vehicle 230, and database server 240 via network 202.

With continued reference to FIG. 2, battery selection program 220, in an exemplary embodiment, may be a computer application on host server 210 that contains instruction sets, executable by a processor. The instruction sets may be described using a set of functional modules. In exemplary embodiments, battery selection program 220 may receive input from electric vehicle 230 and database server 240 over network 202. In alternative embodiments, battery selection program 220 may be a computer application on electric vehicle 230, or a standalone program on a separate electronic device.

With continued reference to FIG. 2, the functional modules of battery selection program 220 include identifying module 222, configuring module 224, estimating module 226, and selecting module 228.

Figure 3:
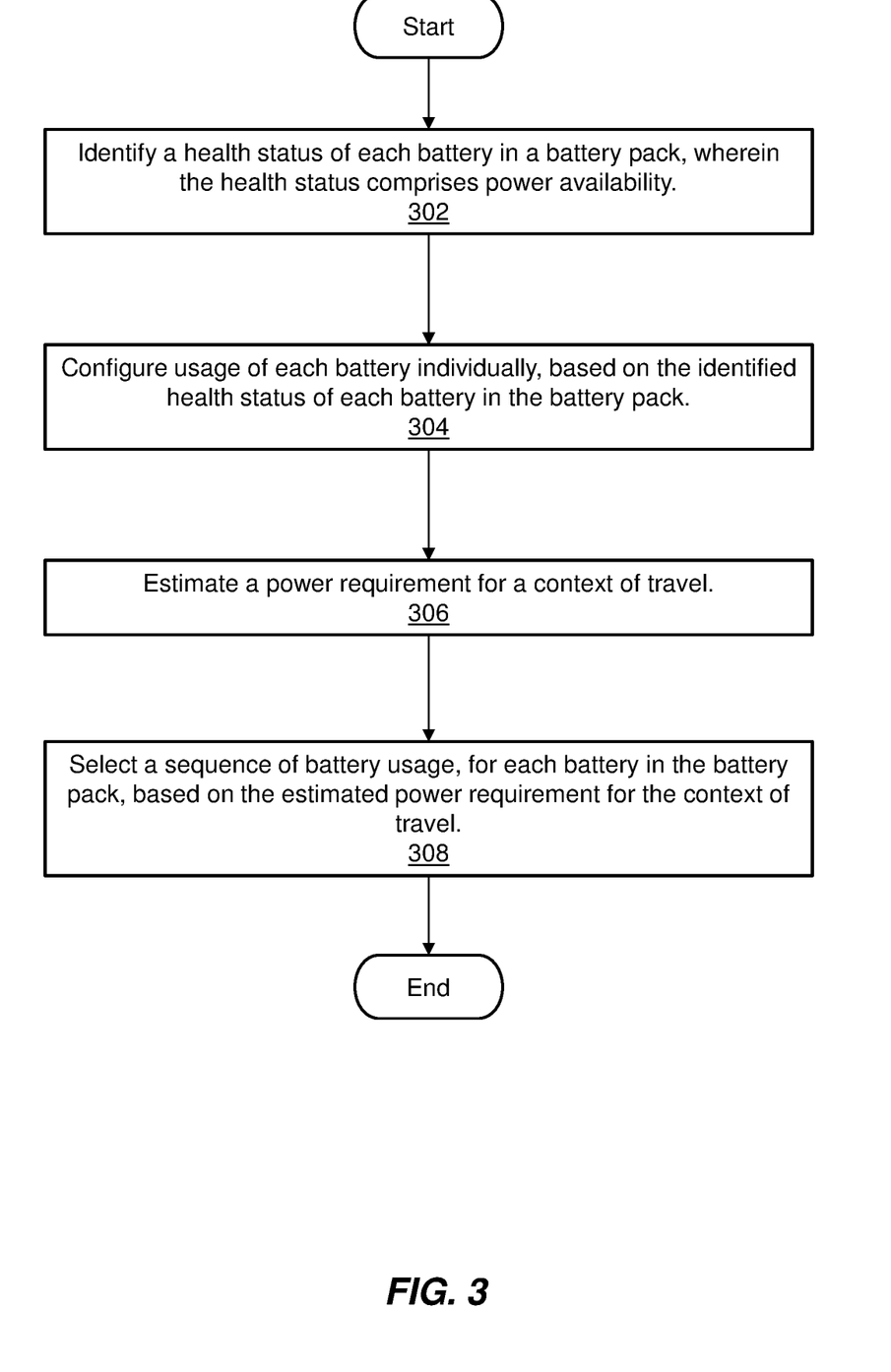
FIG. 3 is a flowchart illustrating the operation of battery selection program 220 of FIG. 2, in accordance with an embodiment of the present invention.

FIG. 3 is a flowchart illustrating the operation of battery selection program 220 of FIG. 2, in accordance with embodiments of the present disclosure.

With reference to FIGS. 2 and 3, identifying module 222 includes a set of programming instructions, in battery selection program 220, to identify a health status of each battery in a battery pack, wherein the health status comprises power availability (step 302). The set of programming instructions is executable by a processor.

In exemplary embodiments, monitoring system 236 gathers information from sensors 238 located inside electric vehicle 230. From the gathered sensor information, based on scanning and usage data of each battery from battery pack 234, identifying module 222 identifies the health status of each battery in battery pack 234.

The health status of each battery may include a level of power remaining, a temperature, and any other measurement known to one of ordinary skill in the art, that assesses a battery's current state compared with the specified norms/configuration from the battery brand manufacturer.

In exemplary embodiments, identifying module 222 identifies a norm for a rate of charging and a rate of cool-down time required for each battery in the battery pack 234, wherein the norm is pre-defined based on a battery manufacturer.

In further exemplary embodiments, identifying module 222 links the pre-defined norm with the identified health status of each battery in the battery pack 234.

In alternative embodiments, identifying module 222 evaluates, continuously, the health status of each battery in the battery pack 234, reconfigures the usage of each battery, and updates the context of travel based on the identified norm for the rate of charging and rate of cool-down time required for each battery in the battery pack 234.

In exemplary embodiments, identifying module 222 identifies the relative position and power availability of each battery in battery pack 234, based on feeds from sensors 238.

With reference to an illustrative example, Joe is driving his EV through the Rocky Mountains and is concerned whether his vehicle will have enough power to make the trip. Luckily, Joe's EV is equipped with battery selection program 220, which identifies the health of each battery in the battery pack of Joe's EV. Battery selection program 220 aligns the identified health of each battery with the manufacturer specified norms/configuration for each battery.

With continued reference to FIGS. 2 and 3, configuring module 224 includes a set of programming instructions in battery selection program 220, to configure usage of each battery individually, based on the identified health status of each battery in the battery pack (step 304). The set of programming instructions is executable by a processor.

In exemplary embodiments, different batteries in battery pack 234 will have different configurations and, accordingly, will be selected for battery usage at different times in any given travel context.

In exemplary embodiments, configuring module 224 identifies available power in different batteries in battery pack 234 and identifies the configuration for each of the batteries in batter pack 234.

In exemplary embodiments, configuring module 224 identifies when each battery needs to stop supplying power and be allowed to cool down for a next future usage.

In alternative embodiments, configuring module 224 further includes tracking, via sensors 238, heat generation with each battery in the battery pack 234, based on usage and cool-down time; estimating the health status of each battery in the battery pack 234, based on tracking the heat generation; and assigning a different configuration to each battery based on the estimated health status.

With continued reference to FIGS. 2 and 3, estimating module 226 includes a set of programming instructions in battery selection program 220, to estimate a power requirement for a context of travel (step 306). The set of programming instructions is executable by a processor.

In exemplary embodiments, the context of travel includes at least one or more of the following criteria: a selection of a route; road parameters (e.g. curvy, rocky, asphalt, dirt, steep incline, rolling hills, etc.); weather parameters (e.g., rainy, snowy, foggy, sunny, windy, etc.); traffic conditions (e.g., standstill, accident, closed roads, detour, etc.); and additional power required by electric vehicle 230 for various services to a user (e.g., USB connectors, display screen use, air-conditioning, heat, power windows and doors, radio, etc.).

In exemplary embodiments, estimating module 226 further includes receiving vehicle-to-everything (V2X) feedback, while traveling along a route, to identify how much power will be required by electric vehicle 230 for the context of travel, and creating a plan of battery usage, based on the power requirement and the identified health status of each battery in the battery pack 234.

V2X is a communication between a vehicle and any entity that may affect, or may be affected by, the vehicle. It is a vehicular communication system that incorporates other more specific types of communication as vehicle-to-infrastructure (V2I), vehicle-to-network (V2N), vehicle-to-vehicle (V2V), vehicle-to-pedestrian (V2P), and vehicle-to-device (V2D). The main motivations for V2X are road safety, traffic efficiency, and energy savings.

In exemplary embodiments, estimating module 226 may estimate a power requirement for electric vehicle 230 based on historical learning of a contextual situation along different portions of a roadway. The historical learning of various contextual situations are stored in historical usage corpus 242.

With continued reference to the illustrative example above, battery selection program 220 estimates that Joe will be driving up a 45-degree incline during a first 3-mile portion of roadway. The successive 20-mile portion of roadway through the Rocky Mountains is a medium to low incline. Estimating module 226 estimates a power requirement needed for Joe's EV to complete the travel plan through the mountains.

With continued reference to FIGS. 2 and 3, selecting module 228 includes a set of programming instructions in battery selection program 220, to select a sequence of battery usage, for each battery in the battery pack, based on the estimated power requirement for the context of travel (step 308). The set of programming instructions is executable by a processor.

In exemplary embodiments, selecting module 228 determines how long the battery needs to be used before switching to another battery in the battery pack 234, and identifies when a respective battery needs to stop supplying power and be allowed to cool down.

In exemplary embodiments, selecting module 228 classifies a road length, along a chosen route, based on the power requirement of battery pack 234. Based on the power requirement needed, selecting module 228 identifies when the respective batteries in battery pack 234 need to be switched and, for each switching, one or more batteries will be switched.

In exemplary embodiments, for each classified travel distance, the proposed system estimates how much power will be required by the electric vehicle 230. The proposed system considers the available power with each battery in the battery pack 234, and then selects the configuration of each battery.

In exemplary embodiments, selecting module 228 selects which batteries are to be selected for the travel context, and for how long each selected battery will be used.

The proposed system identifies when each selected battery usage needs to stop supplying power and be allowed to cool down for the next usage.

In exemplary embodiments, battery selection program 220 continues to evaluate the batteries and re-configures the selection of the battery usage so that the life of the batteries are maximized.

With continued reference to the illustrative example above, selecting module 228 determines that Joe's EV includes a total of eight batteries. Based on the power requirement and health status of the batteries, a first batch of selected four batteries will be used to power Joe's electric vehicle 230 through the first 3-miles of the mountainous roadway. Selecting module 228 then switches to a second batch of the other four unused batteries along the successive 20-mile portion of roadway through the Rocky Mountains. During the usage of the batteries in the second batch, the first batch of four batteries will be allowed to cool down. In this fashion, the life of the batteries in Joe's EV are maximized for his trip.

In exemplary embodiments, network 202 is a communication channel capable of transferring data between connected devices and may be a telecommunications network used to facilitate telephone calls between two or more parties comprising a landline network, a wireless network, a closed network, a satellite network, or any combination thereof. In another embodiment, network 202 may be the Internet, representing a worldwide collection of networks and gateways to support communications between devices connected to the Internet. In this other embodiment, network 202 may include, for example, wired, wireless, or fiber optic connections which may be implemented as an intranet network, a local area network (LAN), a wide area network (WAN), or any combination thereof. In further embodiments, network 202 may be a Bluetooth network, a WiFi network, or a combination thereof. In general, network 202 can be any combination of connections and protocols that will support communications between host server 210, electric vehicle 230, and database server 240.

The invention claimed is:

1. A computer-implemented method comprising:
    identifying a health status of each battery in a battery pack, wherein the health status comprises power availability, and wherein monitored battery data of each battery in the battery pack is transmitted on a continuous basis;
    identifying a norm for a rate of charging and a rate of cool-down required for each battery in the battery pack;
    identifying how much power can be provided to a vehicle in different time ranges;
    configuring usage of each battery individually, based on the identified health status of each battery in the battery pack, so that each battery in the battery pack does not generate more than an assigned temperature limit and can get required cool-down time after usage;
    estimating a power requirement for a context of travel;
    selecting a sequence of battery usage, for each battery in the battery pack, wherein batteries are configured to alternate between active and cool-down states, based on the estimated power requirement for the context of travel;
    identifying when a respective battery in the battery pack needs to be switched, based on the estimated power requirement for the context of travel; and
    switching the respective battery in the battery pack after identifying when the respective battery in the battery pack needs to be switched.

2. The computer-implemented method of claim 1, wherein the context of travel comprises at least one or more of the following: a selection of a route; road parameters; weather parameters; traffic conditions; and additional power required by a vehicle for various services to a user.

3. The computer-implemented method of claim 1, further comprising:
    identifying a norm for a rate of charging and a rate of cool-down time required for each battery in the battery pack, wherein the norm is pre-defined based on a battery manufacturer; and
    linking the pre-defined norm with the identified health status of each battery in the battery pack.

4. The computer-implemented method of claim 3, further comprising:
    evaluating, continuously, the health status of each battery in the battery pack;
    reconfiguring the usage of each battery; and
    updating the context of travel, based on the identified norm for the rate of charging and rate of cool-down time required for each battery in the battery pack.

5. The computer-implemented method of claim 1, wherein the battery pack is in an electric vehicle and includes sensor feeds to identify the health status of each battery in the battery pack.

6. The computer-implemented method of claim 1, wherein estimating a power requirement for traveling a route further comprises:
    receiving vehicle-to-everything (V2X) feedback to identify how much power will be required by an electric vehicle for the context of travel; and
    creating a plan of battery usage, based on the power requirement and the identified health status of each battery in the battery pack.

7. The computer-implemented method of claim 1, wherein selecting a sequence of battery usage further comprises:
    determining how long the battery needs to be used before switching to another battery in the battery pack; and
    identifying when the battery needs to stop supplying power and be allowed to cool down.

8. The computer-implemented method of claim 1, wherein configuring usage of each battery individually, based on the identified health status of each battery in the battery pack, further comprises:
    tracking, via sensors, heat generation with each battery in the battery pack, based on usage and cool-down time;
    estimating the health status of each battery in the battery pack, based on tracking the heat generation; and
    assigning a different configuration to each battery based on the estimated health status.

9. A computer program product, comprising a tangible storage device having program code embodied therewith, the program code executable by a processor of a computer to perform a method, the method comprising:
    identifying a health status of each battery in a battery pack, wherein the health status comprises power availability, and wherein monitored battery data of each battery in the battery pack is transmitted on a continuous basis;
    identifying a norm for a rate of charging and a rate of cool-down required for each battery in the battery pack;
    identifying how much power can be provided to a vehicle in different time ranges;
    configuring usage of each battery individually, based on the identified health status of each battery in the battery pack, so that each battery in the battery pack does not generate more than an assigned temperature limit and can get required cool-down time after usage;
    estimating a power requirement for a context of travel;
    selecting a sequence of battery usage, for each battery in the battery pack, wherein batteries are configured to alternate between active and cool-down states, based on the estimated power requirement for the context of travel;
    identifying when a respective battery in the battery pack needs to be switched, based on the estimated power requirement for the context of travel; and
    switching the respective battery in the battery pack after identifying when the respective battery in the battery pack needs to be switched.

10. The computer program product of claim 9, wherein the context of travel comprises at least one or more of the following: a selection of a route; road parameters; weather parameters; traffic conditions; and additional power required by a vehicle for various services to a user.

11. The computer program product of claim 9, further comprising:
   identifying a norm for a rate of charging and a rate of cool-down time required for each battery in the battery pack, wherein the norm is pre-defined based on a battery manufacturer; and
   linking the pre-defined norm with the identified health status of each battery in the battery pack.

12. The computer program product of claim 11, further comprising:
   evaluating, continuously, the health status of each battery in the battery pack;
   reconfiguring the usage of each battery; and
   updating the context of travel, based on the identified norm for the rate of charging and rate of cool-down time required for each battery in the battery pack.

13. The computer program product of claim 9, wherein the battery pack is in an electric vehicle and includes sensor feeds to identify the health status of each battery in the battery pack.

14. The computer program product of claim 9, wherein estimating a power requirement for traveling a route further comprises:
   receiving vehicle-to-everything (V2X) feedback to identify how much power will be required by an electric vehicle for the context of travel; and
   creating a plan of battery usage, based on the power requirement and the identified health status of each battery in the battery pack.

15. The computer program product of claim 9, wherein selecting a sequence of battery usage further comprises:
   determining how long the battery needs to be used before switching to another battery in the battery pack; and
   identifying when the battery needs to stop supplying power and be allowed to cool down.

16. A computer system, comprising:
   one or more computer devices each having one or more processors and one or more tangible storage devices; and
   a program embodied on at least one of the one or more storage devices, the program having a plurality of program instructions for execution by the one or more processors, the program instructions comprising instructions for:
   identifying a health status of each battery in a battery pack, wherein the health status comprises power availability, and wherein monitored battery data of each battery in the battery pack is transmitted on a continuous basis;
   identifying a norm for a rate of charging and a rate of cool-down required for each battery in the battery pack;
   identifying how much power can be provided to a vehicle in different time ranges;
   configuring usage of each battery individually, based on the identified health status of each battery in the battery pack, so that each battery in the battery pack does not generate more than an assigned temperature limit and can get required cool-down time after usage;
   estimating a power requirement for a context of travel; and
   selecting a sequence of battery usage, for each battery in the battery pack, wherein batteries are configured to alternate between active and cool-down states, based on the estimated power requirement for the context of travel;
   identifying when a respective battery in the battery pack needs to be switched, based on the estimated power requirement for the context of travel; and
   switching the respective battery in the battery pack after identifying when the respective battery in the battery pack needs to be switched.

17. The computer system of claim 16, wherein the context of travel comprises at least one or more of the following: a selection of a route; road parameters; weather parameters; traffic conditions; and additional power required by a vehicle for various services to a user.

18. The computer system of claim 16, further comprising:
   identifying a norm for a rate of charging and a rate of cool-down time required for each battery in the battery pack, wherein the norm is pre-defined based on a battery manufacturer; and
   linking the pre-defined norm with the identified health status of each battery in the battery pack.

19. The computer system of claim 18, further comprising:
   evaluating, continuously, the health status of each battery in the battery pack;
   reconfiguring the usage of each battery; and
   updating the context of travel, based on the identified norm for the rate of charging and rate of cool-down time required for each battery in the battery pack.

20. The computer system of claim 16, wherein the battery pack is in an electric vehicle and includes sensor feeds to identify the health status of each battery in the battery pack.

\* \* \* \* \*